(12) United States Patent
 Eid (10) Patent No.: US 9,613,137 B2
(45) Date of Patent: Apr. 4, 2017

(54) REMOTE IDENTIFICATION OF VEHICLE STATUS

(71) Applicant: Gilbert Eid, Kahhaleh (LB)

(72) Inventor: Gilbert Eid, Kahhaleh (LB)

(*) Notice: Subject to any disclaimer, the term of this patent is extended or adjusted under 35 U.S.C. 154(b) by 174 days.

(21) Appl. No.: 14/172,025

(22) Filed: Feb. 4, 2014

(65) Prior Publication Data

US 2014/0149454 A1   May 29, 2014

(51) Int. Cl.
*G06F 17/30* (2006.01)
*G06Q 10/08* (2012.01)

(52) U.S. Cl.
CPC ..... *G06F 17/30725* (2013.01); *G06Q 10/087* (2013.01)

(58) Field of Classification Search
CPC .................................................... G06Q 10/087
See application file for complete search history.

(56) References Cited

U.S. PATENT DOCUMENTS

| | | | | |
|---|---|---|---|---|
| 6,476,715 B1* | 11/2002 | Bromer | ................... | B60R 25/00 340/425.5 |
| 7,049,942 B2* | 5/2006 | Gallovich | ........... | B60R 25/1025 307/10.2 |
| 2004/0085207 A1* | 5/2004 | Kreiner | ................ | G06Q 10/087 340/572.1 |
| 2005/0143883 A1* | 6/2005 | Yamagiwa | ............. | G06Q 10/06 701/29.6 |
| 2007/0112620 A1* | 5/2007 | Johnson | ................. | G07B 15/00 705/13 |
| 2007/0187266 A1* | 8/2007 | Porter | ....................... | A63F 1/02 206/232 |
| 2011/0140927 A1* | 6/2011 | Lee | ......................... | G08G 1/207 340/993 |
| 2012/0106801 A1* | 5/2012 | Jackson | ................. | G08G 1/205 382/105 |
| 2014/0370917 A1* | 12/2014 | Buchheim | ............. | H04W 4/026 455/456.1 |

* cited by examiner

*Primary Examiner* — Robert Beausoliel, Jr.
*Assistant Examiner* — Arthur Ganger
(74) *Attorney, Agent, or Firm* — Georgiy L. Khayet (57) ABSTRACT

Methods and systems for identification of vehicle statuses are provided. This technology requires installation of identification tags, such as, for example, RFID tags or Wi-Fi tags, on vehicles, which actively or passively emit identification signals conveying vehicle identifiers. Interested parties, such as members of the public or police officers, are equipped with electronic devices (e.g., a tablet computer) suitable for receiving and processing the identification signals and processing the signals to obtain a vehicle status. The vehicle status allows determining whether the vehicle was stolen, is wanted, should be classified as suspicious, or is associated with any offences. The vehicle status is obtained by querying a database of vehicle statuses. Once vehicle status is obtained by the electronic device, it is displayed to the interested party. The technology further enables locating vehicles that do not emit an identification signal and reporting their location to authorities.

22 Claims, 10 Drawing Sheets

REMOTE IDENTIFICATION OF VEHICLE STATUS

TECHNICAL FIELD

This disclosure relates generally to vehicle identification and, more specifically, to the wireless technology for identifying of stolen, wanted, or suspicious vehicles.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Automobile theft is one of the most commonly occurring crimes all over the world. For example, about one million motor vehicles are stolen in the United States every year, representing annual property losses of over $5 billion dollars. Moreover, vehicles can be stolen to assist criminals in even more serious crimes, such as homicides or terrorist attacks.

Traditional vehicle anti-theft solutions may include various electro-mechanical locks, car alarm systems, immobilizers, intelligent engine controlling firmware, and others. Unfortunately, seasoned criminals often overcome these anti-theft solutions in order to steal vehicles. Satellite and other remote monitoring systems have been also used to locate stolen vehicles. Criminals can also overcome such solutions by immobilizing or removing related equipment from the vehicle. Additionally, these solutions have created serious privacy concerns and have been outlawed in many jurisdictions.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Various embodiments of the present disclosure provide methods and systems for effective vehicle identification, which can be utilized in finding stolen, wanted, or suspicious motor vehicles. The methods and systems disclosed herein can be utilized not only by general public, for example, in the form of "crowdsourcing," but also by authorities such as government officials or police officers. Notably, the present technology allows locating stolen vehicles while respecting privacy laws and complying with constitutional rights of the citizens.

Specifically, the present technology involves installation of wireless passive or active identification tags on all or certain motor vehicles within a dedicated area such as a country, state, district, or private land. The identification tag can be configured to emit identification signals, which includes a vehicle identifier and, optionally, other information. The identification signal can be propagated across a relatively short distance, for example, less than 300 feet or even less than 100 feet when the vehicle is in an unassisted view of a human eye. The present technology may also employ the use of an electronic device, such as a portable computer, tablet computer, or wireless telephone, which includes a special reader or antenna configured to wirelessly communicate with the identification tags installed on vehicles. For these ends, the electronic device may run a dedicated software application (e.g., mobile application) to implement the described herein methods for communication with the identification tags and remote databases to identify a status of a particular motor vehicle, make reports, and so forth. In particular, upon receipt of the identification signals from vehicle in proximity of the electronic device, the software application can make a determinative decision for its user as to whether a particular motor vehicle is stolen, wanted, or needs to be monitored in view of specific circumstances. The determination can be made by sending requests to one or more remote servers maintaining a database of vehicle statuses and by analyzing the server's response. Notably, the remote server(s) may also maintain a database with vehicle registration and/or vehicle related information. Moreover, the remote server(s) may also maintain or be operatively connected to government databases of the same or similar content. The server(s), upon receiving a request from the electronic device, can return vehicle status information (e.g., 'stolen,' 'wanted,' etc.) and, optionally, other vehicle-related information including, for example, vehicle registration information, list of prior offences, incidents, accidents, owner's name, plate number, date of state inspection, vehicle's color, vehicle's year, vehicle identification number, and so forth. The vehicle status may be displayed to the user of the electronic device to prompt the user to take certain actions. The actions may include, without limitation, reporting the location of the stolen vehicle to authorities or to a database maintained by one of the servers.

Accordingly, the present technology allows individuals or public authorities to remotely scan and verify statuses of motor vehicles based upon identification signals emitted by these vehicles. In further example embodiments, steps of methods described herein may be stored on a computer readable storage medium having program instructions embodied thereon, with the program instructions executable by a processor in a computing device. In yet further exemplary embodiments, modules, subsystems, or devices can be adapted to perform the method steps. Other features and exemplary embodiments will be evident from the detailed description provided below.

BRIEF DESCRIPTION OF DRAWINGS

Embodiments are illustrated by way of example and not limitation in the figures of the accompanying drawings, in which like references indicate similar elements and in which.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors, controllers or other specially designed application-specific integrated circuits (ASICs), programmable logic devices, or various combinations thereof. In particular, the methods described herein may be implemented by a series of computer-executable instructions residing on a storage medium such as a disk drive, solid-state drive or on a computer-readable medium.

In general, various embodiments of the present disclosure implement a technology for vehicle identification and, more specifically, identification of a vehicle status. The technology involves installation of identification tags on vehicles, which can actively or passively emit identification signals conveying vehicle identifiers and, optionally, other information. A member of the public or an interested party, such as a police officer or parking officer, can be equipped with an electronic device suitable for receiving identification signals from the device installed on the vehicle and process the signals in order to identify the vehicle's status. The vehicle status can be indicative of whether a particular vehicle is stolen, wanted, associated with specific criminal offences, or if a vehicle is parked, on travel, unlisted (i.e., a fake signal), pass, and so forth. The vehicle status can be obtained by querying remote databases maintained by at least one server. Once vehicle status is determined, it can be displayed or presented to the member of the public or other interested parties in various ways (e.g., on a display or by an audio signal).

The present technology can also enable its users to make reports when, for example, the member of the public or another interested party finds a vehicle not emitting an identification signal. Lack of this signal may be interpreted as illegal removal of identification tags from a stolen vehicle. The user can visually identify the non-emitting vehicle since the device displays a description of the nearby vehicles. The vehicle not emitting any signal is not on the list. Another way to identify a non-emitting vehicle is by counting vehicles either manually or with the help of specific hardware. To these ends, the electronic device may enable its user to generate and send an electronic message to the server or at relevant authorities and identify the location where a suspicious vehicle is located, a photo of a vehicle, and other related information or commentaries.

Accordingly, provided all vehicles within a specific area, such as a nation, country, state, district, or otherwise enclosed area, such as a private land or premises, are equipped with the identification tags, the present technology allows efficient detection of vehicle statuses. It is a very convenient and straightforward technology for the use by the general public, government officials, military and police officers, and other authorities. The vehicle status may not only include information indicative of a particular vehicle being stolen or wanted, but also indicate whether any fines are outstanding, whether the vehicle passed a required inspection, whether the vehicle is associated with any civil or criminal offences, and so forth. Users will have access to information according to their level of clearance.

It is also important that, in certain embodiments, vehicle owners can themselves set vehicle statuses in the database. For example, the vehicle owners may set the vehicle status to 'parked,' when they parked their vehicles. In other embodiments, the vehicle owners may set the vehicle status to 'on travel,' to designate that their intention is to remove a stopped vehicle from a dedicated area within a short period of time. Accordingly, this technology makes it impossible to take advantage of stealing identification tags from parked vehicles and placing them on stolen vehicles. The present technology allows citizens to determine whether vehicles they own have any outstanding fines, the date of their next vehicle service, permits associated with the vehicle, such as tinted windows, and so forth.

Furthermore, some embodiments of the present technology allow spotting attempts to duplicate identification tags. This 'Chinese wall' option provides for interaction between a database of stolen vehicles and a database of vehicle information based upon analysis of vehicle location data and corresponding vehicle identifiers. More specifically, in an example embodiment, an individual may request information concerning a particular vehicle within a distance range using his electronic device. For these ends, the electronic device acquires a vehicle identifier associated with the vehicle of interest and sends a request to a remote server. This request includes the vehicle identifier and a current location of the electronic device. Another server, which maintains vehicle data, such as location obtained directly from the vehicle in question, compares location data obtained from two independent sources and makes a determination as whether or not the identification tag pertained to the vehicle in question is duplicated. This analysis may also compare time and date when location information was obtained and, optionally, other related information.

Notably, the present technology can serve as an instrument for obtaining information in a way not infringing on citizens' privacy rights, constitutional rights, or any other applicable laws. In some embodiments, the technology provides various clearance levels for the users of the technology. Specifically, there may be provided one clearance level for the general public, another clearance level for security firms, yet another clearance level for police officers and government officials, and so forth. In one example embodiment, the technology may provide the general public with the lowest clearance level, which means they may not need to use credentials to access certain types of information from third parties, such as basic vehicle description and display of status. Accordingly, the general public may have some limitations as to what information can be delivered to them through the use of the present technology. On the other hand, a higher level of clearance may be given to police officers meaning they need to have credentials to access and run the methods and functionalities as described herein. In return, the police officers may have access to information without any limitations or with fewer limitations. In some embodiments, access to the methods and functionalities of the present technology may require prior user authentication and authorization, for example, based upon biometric information (e.g., fingerprints, retina or iris images, face images) or a two-step authorization technique.

One aspect of the present technology relates to the maintaining of ad hoc online services for storing vehicle related information. More specifically, there are provided one or more web servers, which have a first database of vehicle statuses and a second database of registered vehicles. The first database includes merely vehicle statuses (i.e., 'stolen,' 'wanted,' 'parked,' etc.), while the second database includes vehicle registration data, vehicle description data, user comments associated with various vehicles, and so forth.

At least one of these databases is a "crowdsourcing" data collection meaning that the content stored in the database is solicited by contributions from a large group of people—online community or general public—rather than from traditional employees or suppliers. However, in some embodiments, the databases may relate to government databases or proprietary databases maintained by a limited number of people. In either case, the databases are tamper proof from within and from the outside through the use of private and public keys, encryption, cryptography, challenge response mechanisms, and tracking of quota and asynchronous calls, among other mechanisms. Accordingly, the insertion of new vehicles into the databases is a safe process as long as the above security mechanisms are implemented.

In general, the present technology allows significantly decreasing car theft rates and increasing the rates of stolen vehicle recovery. In addition, it provides an easy to use mobile application or specific hardware with limited clearance for the general public that attracts a great number of people to be a part of a nation-wide vehicle security system. Provided below is a detailed description of various embodiments with reference to accompanying drawings.

Figure 1:
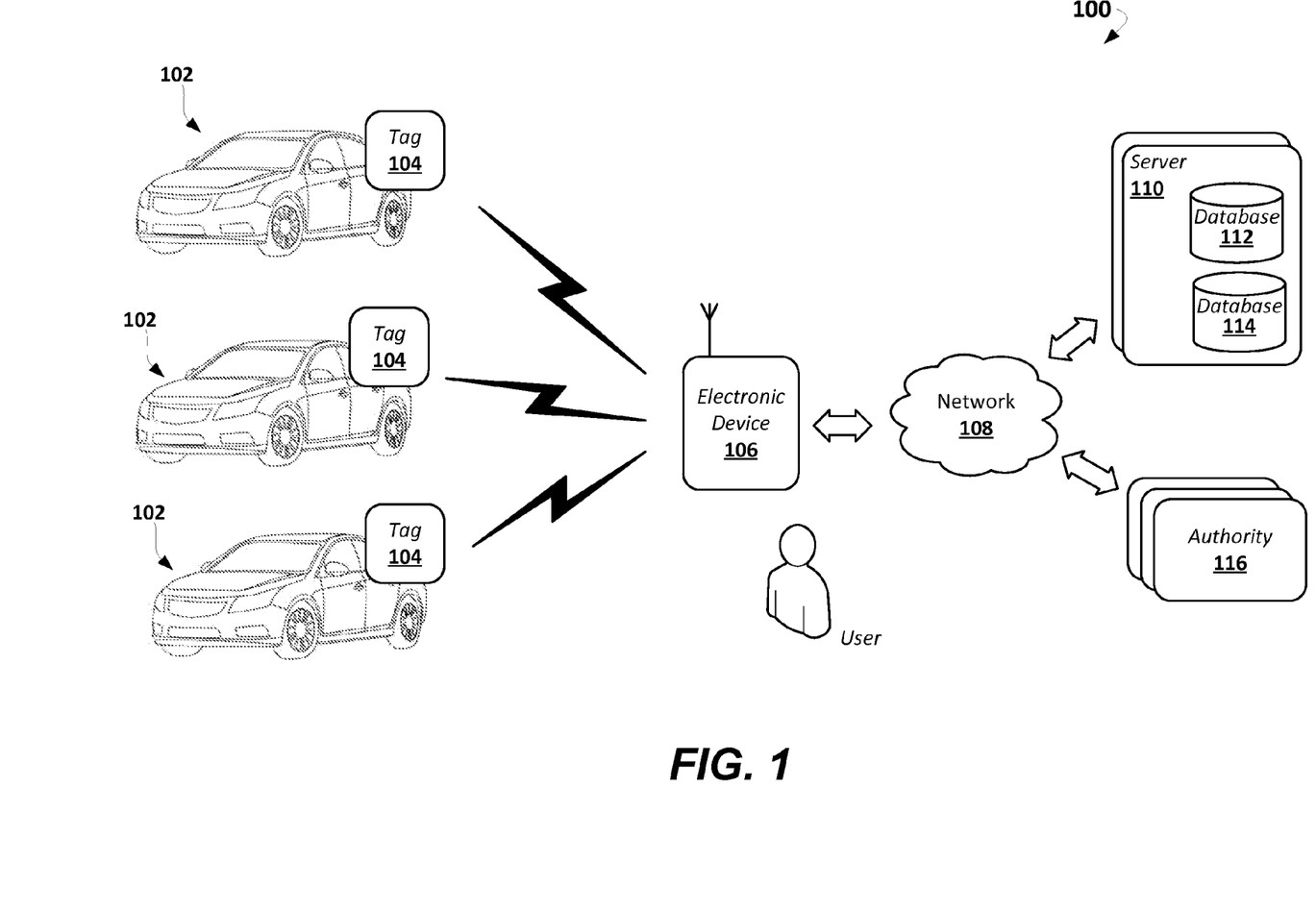
FIG. 1 shows a high-level block diagram illustrating a system environment within which methods for vehicle identification may be implemented.

FIG. 1 shows a high-level block diagram illustrating a system environment 100 within which methods for vehicle identification may be implemented, in accordance with an example embodiment. In particular, there are shown a number of motor vehicles 102, each of which is equipped with an identification tag 104. The terms "vehicle" or "motor vehicle,'" as used herein, refer to any machine suitable for transferring passengers or cargo. This may include, without limitation, automobiles, cars, trucks, buses, motorcycles, bicycles, trains, ships, boats, watercrafts, and aircraft.

The identification tags 104 may include, for example, radio-frequency identification (RFID) tags, labels, or transponders, as well as wireless transmitters, portable communication devices, Wi-Fi emitter tags, and so forth. In case of RFID tags, the identification tags 104 may be of passive or active types. Passive identification tags 104 are powered by and read at short ranges via magnetic fields so that they emit electromagnetic waves conveying certain information. In other words, the passive identification tag 104, when powered, emits an identification signal. Active identification tags 104 are powered by a local power source, such as a battery, and repeatedly emit an identification signal. According to various embodiments, the identification signal includes at least a vehicle identifier (vehicle identifier refers, for example, to a unique alphanumeric code). In certain embodiments, the identification signal may also include other information such as a plate number and vehicle registration data, among other things. It should be also noted that the identification tags 104 emit identification signals with a limited short-range area. In some examples, the area of identification signal propagation is limited to 300 feet, although it is limited to 100 feet or even less in other example embodiments. The identification tags 104 are secured to the vehicles 102 in designated places. In one example, the tags 104 can be attached to or be an integral part of a license plate or a windshield sticker.

Still referencing to FIG. 1, there is provided an electronic device 106, which may refer, without limitation, to a portable computing device, tablet computer, laptop computer, general-purpose computer, netbook, mobile phone, smart phone, personal digital assistant, video recording system, and surveillance system, among others. The electronic device 106 is further described below and shown in FIG. 2. The electronic device 106 may be in possession of an individual, such as a police officer, although many other people may find it useful.

In general, the electronic device 106 is configured to wirelessly communicate with the identification tags 104. This may include powering and activating passive identification tags 104 by emitting electromagnetic waves and receiving responses from identification tags (i.e., identification signals). In other example embodiments, the electronic device 106 passively aggregates identification signals from active identification tags 104.

Upon receipt of the identification signals from the identification tags 104, the electronic device 106 processes them to retrieve vehicle identifiers associated with the vehicles 102. Further, the vehicle identifiers are used to obtain vehicle status data. In one example, the electronic device 106 inquires its own database of vehicle statuses (not shown) with the vehicle identifiers to determine if one of the vehicles 102 is stolen or wanted, or to retrieve vehicle registration data or related information. In another example, the electronic device 106 inquires, via a communication network 108, a server 110. The server 110 maintains a database, such as a database 112 of vehicle statuses, although the server 110 can maintain other databases including, but not limited to, a database 114 of registered vehicles containing vehicle registration data, state inspection data, information associated with outstanding fines or tickets, prior offences or traffic violation data, or a combination thereof. In some embodiments, the servers run crowdsourcing software to allow the general public to solicit content of the databases 112, 114. In some other embodiments, the server 110 may include, be an integral part of, or in some other way be associated with the National Motor Vehicle Title Information System (NMVTIS), National Crime Information Center (NCIC), and Driver and Vehicle Licensing Agency (DVLA), among others.

In either case, the server 110 acquires the vehicle identification from the electronic device 106 and sends back a response conveying a partial record stored in the database 112 of vehicle statuses and optionally records from other databases such as the database 114. In a most simple case, the response contains a vehicle status like 'Pass' or 'Fail,' which may be coded in a single bit message element. In other words, the response includes information as to whether or not a particular vehicle 102 is listed in the database 112 of vehicle statuses. Thus, the electronic device 106 determines, based upon the server's response, the vehicle status and may display it on its screen, generate an alert audio or video message, and the like. The user of the electronic device 106 in certain cases, such as when a stolen vehicle is identified, may report it to one or more of authorities 116. Authorities 116 refers, without limitation, to a police department, Federal Bureau of Investigation (FBI), private security provider or firm, military, NMVTIS, NCIC, DVLA, or a combination thereof.

Figure 2:
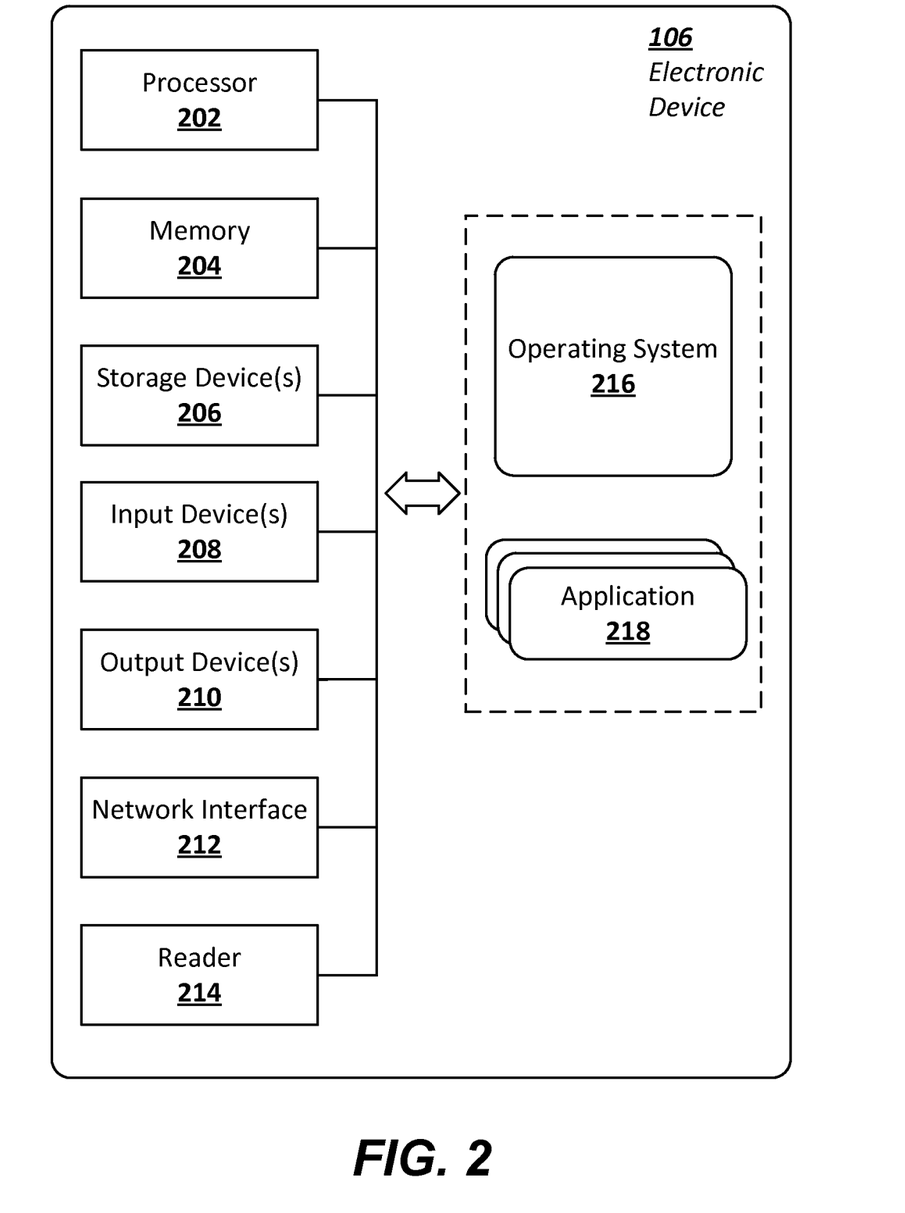
FIG. 2 is a diagrammatic representation of an example electronic device in the form of a computer system within which a set of instructions for the electronic device to perform any one or more of the methodologies discussed herein is executed.

FIG. 2 is a high-level block diagram illustrating an example electronic device 106 suitable for implementing methods described herein. In particular, the electronic device 106 may be used for vehicle identification and identification of vehicle status. The electronic device 106 may include, be, or be an integral part of one or more of a variety of types of devices, such as a general-purpose computer, desktop computer, laptop computer, tablet computer, netbook, mobile phone, smartphone, personal digital assistant, vehicle computer, infotainment system, security device, and surveillance device, among others. Furthermore, the electronic device 106 may be an integrated part of another multi-component system such as a vehicle monitoring systems.

As shown in FIG. 2, the electronic device 106 includes one or more processors 202, a memory 204, one or more storage devices 206, one or more input devices 208, one or more output devices 210, network interface 212, and a reader 214 (e.g., an antenna, interrogator, or reading device for RFID tags 102). One or more processors 202 are, in some examples, configured to implement functionality and/or process instructions for execution within the electronic device 106. For example, the processors 202 may process instructions stored in memory 204 and/or instructions stored on storage devices 206. Such instructions may include components of an operating system 216 or software application(s) 218. Electronic device 106 may also include one or more additional components not shown in FIG. 2, such as a housing, power supply, battery, and global positioning system (GPS) receiver, among others.

Memory 204, according to one example, is configured to store information within the electronic device 106 during operation. Memory 204, in some example embodiments, may refer to a non-transitory computer-readable storage medium or a computer-readable storage device. In some examples, memory 204 is a temporary memory, meaning that a primary purpose of memory 204 may not be long-term storage. Memory 204 may also refer to a volatile memory, meaning that memory 204 does not maintain stored contents when memory 204 is not receiving power. Examples of volatile memories include random access memories (RAM), dynamic random access memories (DRAM), static random access memories (SRAM), and other forms of volatile memories known in the art. In some examples, memory 204 is used to store program instructions for execution by the processors 202. Memory 204, in one example, is used by software (e.g., the operating system 216) or applications 218, such as a software application for vehicle identification or identification of vehicle status, executing on electronic device 106 to temporarily store information during program execution. One or more storage devices 206 can also include one or more transitory or non-transitory computer-readable storage media and/or computer-readable storage devices. In some embodiments, storage devices 206 may be configured to store greater amounts of information than memory 204. Storage devices 206 may further be configured for long-term storage of information. In some examples, the storage devices 206 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

Still referencing to FIG. 2, the electronic device 106 may also include one or more input devices 208. The input devices 208 may be configured to receive input from a user through tactile, audio, video, or biometric channels. Examples of input devices 208 may include a keyboard, keypad, mouse, trackball, touchscreen, touchpad, microphone, one or more video cameras, image sensors, or any other device capable of detecting an input from a user or other source, and relaying the input to electronic device 106, or components thereof. Additional examples of input devices 208 include depth sensors, lidars, remote sensors, and so forth. Though shown separately in FIG. 2, the reader 214 may, in some instances, be a part of input devices 208. It should be also noted that the reader 214 may be a peripheral device operatively connected to the electronic device 106 via the network interface 212.

The output devices 210, in some examples, may be configured to provide output to a user through visual or auditory channels. Output devices 210 may include a video graphics adapter card, a liquid crystal display (LCD) monitor, a light emitting diode (LED) monitor, an organic LED monitor, a sound card, a speaker, a lighting device, a LED, a projector, or any other device capable of generating output that may be intelligible to a user. Output devices 210 may also include a touchscreen, presence-sensitive display, or other input/output capable displays known in the art.

The electronic device 106, in some example embodiments, also includes network interface 212. The network interface 212 can be utilized to communicate with external devices via one or more networks such as one or more wired, wireless, or optical networks including, for example, the Internet, intranet, local area network (LAN), wide area network (WAN), cellular phone networks (e.g. Global System for Mobile (GSM) communications network, packet switching communications network, circuit switching communications network), Bluetooth radio, and an IEEE 802.11-based radio frequency network, among others. The network interface 212 may be a network interface card, such as an Ethernet card, an optical transceiver, a radio frequency transceiver, or any other type of device that can send and receive information. Other examples of such network interfaces may include Bluetooth®, 3G, 4G, and WiFi® radios in mobile computing devices as well as USB.

The operating system 216 may control one or more functionalities of electronic device 106 and/or components thereof. For example, the operating system 216 may interact with the applications 218, including an application for vehicle identification or identification of vehicle status, and may facilitate one or more interactions between applications 218 and one or more of processors 202, memory 204, storage devices 206, input devices 208, and output devices 210. As shown in FIG. 2, the operating system 216 may interact with or be otherwise coupled to the application(s) 218 and components thereof. In some embodiments, application(s) 218 may be included in operating system 216. In these and other examples, virtual modules, firmware or software for vehicle identification may be part of the applications 218. In other examples, virtual modules, firmware, or software for vehicle identification may be implemented externally to electronic device 106, such as at a network location. In some such instances, electronic device 106 may use the network interface 212 to access and implement functionalities provided by virtual modules, firmware, or software for vehicle identification through methods commonly known as "cloud computing."

Figure 3:
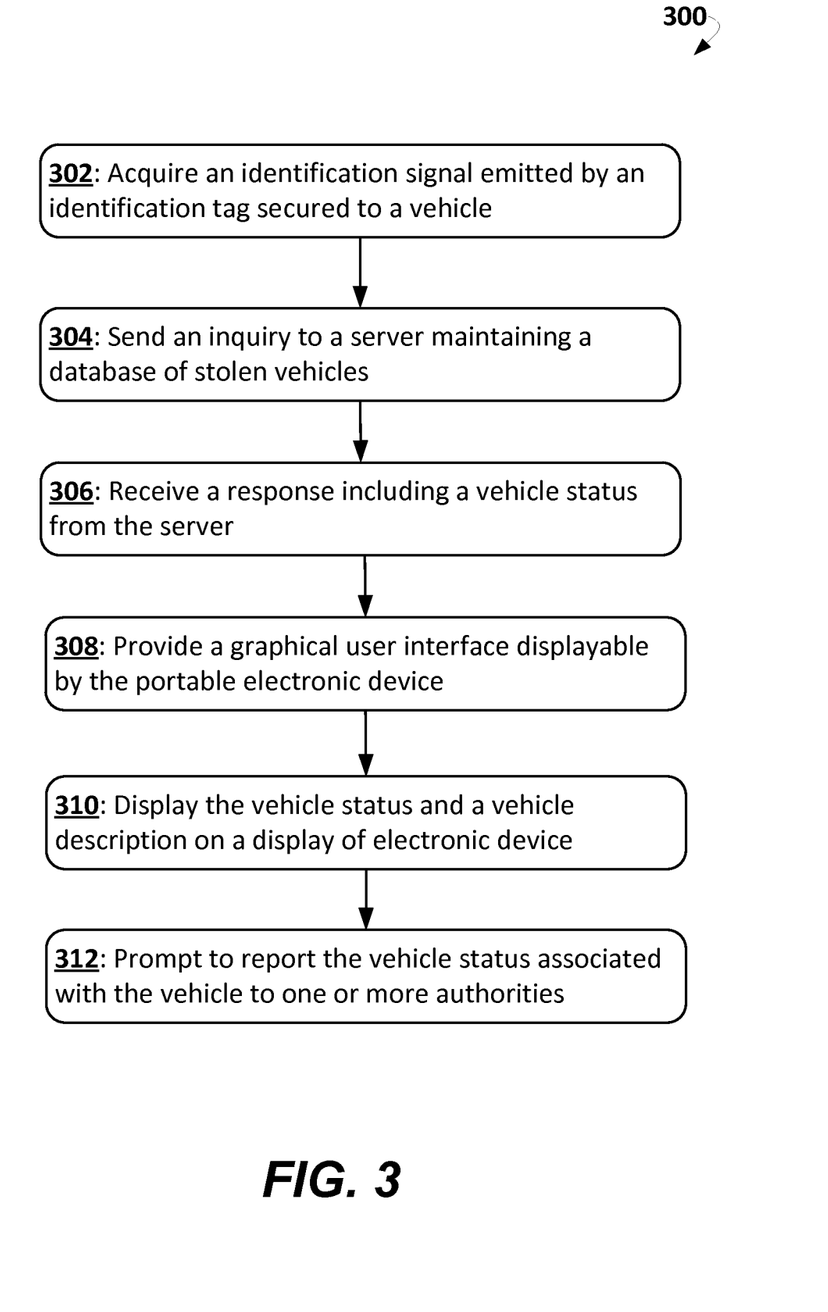
FIG. 3 shows a high-level process flow diagram of a method for vehicle identification according to methodologies discussed herein.

FIG. 3 shows a high-level process flow diagram of a method 300 for vehicle identification according to one exemplary embodiment. The method 300 may be performed by processing logic that may comprise hardware (e.g., one or more processors, controllers, dedicated logic, programmable logic, and microcode), software (such as software run on a general-purpose computer system or a dedicated machine, firmware), or a combination of both. In some example embodiments, the method 300 is implemented by the electronic device 106 shown in FIGS. 1 and 2; however, it should be appreciated that the method 300 is just one example operation of the electronic device 106. In addition, the below recited steps of the method 300 may be implemented in an order different than described and shown in FIG. 3. Moreover, the method 300 may have additional steps not shown herein, but which can be evident for those skilled in the art from the present disclosure. The method 300 may also have fewer steps than outlined below and shown in FIG. 3.

The method 300 commences at step 302 with the electronic device 106 acquiring an identification signal emitted by an identification tag 104 secured to a motor vehicle 102. As described above, the identification signal conveys a vehicle identifier in the form of alphanumeric code. Optionally, the identification signal further includes additional information such as vehicle registration information, and/or plate number, among other things. At step 304, the electronic device 106 sends an inquiry to the server 110, which maintains a database such as the database 112 of vehicle statuses. The inquiry may simply contain the vehicle identifier retrieved from the identification signal and optionally other data. In some embodiments, the same or similar inquiry can be sent to the database 114 of registered vehicles to obtain additional information associated with the vehicle in question. At step 306, the electronic device 106 receives a response form the server 110 with a vehicle status from the database 112 with a basic description of the vehicle and optionally, according to clearance levels, additional data such as vehicle registration information, list of outstanding fines or tickets, list of offences associated with the vehicle 102 or a combination thereof, from the database 114. The vehicle status bears the information as to whether the vehicle 102 is stolen, wanted, suspicious, subject for inspection in view of other reasons, parked, and so forth. Thus, the electronic device 106 determines whether or not the vehicle 102 is listed in the database 112 of vehicle statuses. If the vehicle 102 is listed then the electronic device 106 determines whether the status is pass or fail. If the vehicle 102 is not listed, the signal emitted is considered an altered signal and is reported as an invalid vehicle identifier (VID).

Further, at step 308, the electronic device 106 provides a GUI and displays it on a display of the electronic device 106. Exemplary GUIs are discussed below with reference to FIGS. 4-10. At step 310, the electronic device 106 displays, through the GUI, the vehicle status for attention of the user and optionally other information associated with the vehicle. At step 312, the electronic device 106 prompts the user to report the vehicle status to one of the authorities 116. The reporting includes sending an electronic message or alert via the network 108.

FIGS. 4-10 illustrate schematic diagrams of GUIs displayable by the electronic device 106 at different stages of vehicle status identification. As shown in these drawings, the electronic device 106 is a tablet computer; however, the same or similar GUIs may be provided for other types of electronic devices 106 such as desktop or laptop computers, cellular telephones, and so forth.

Figure 4:
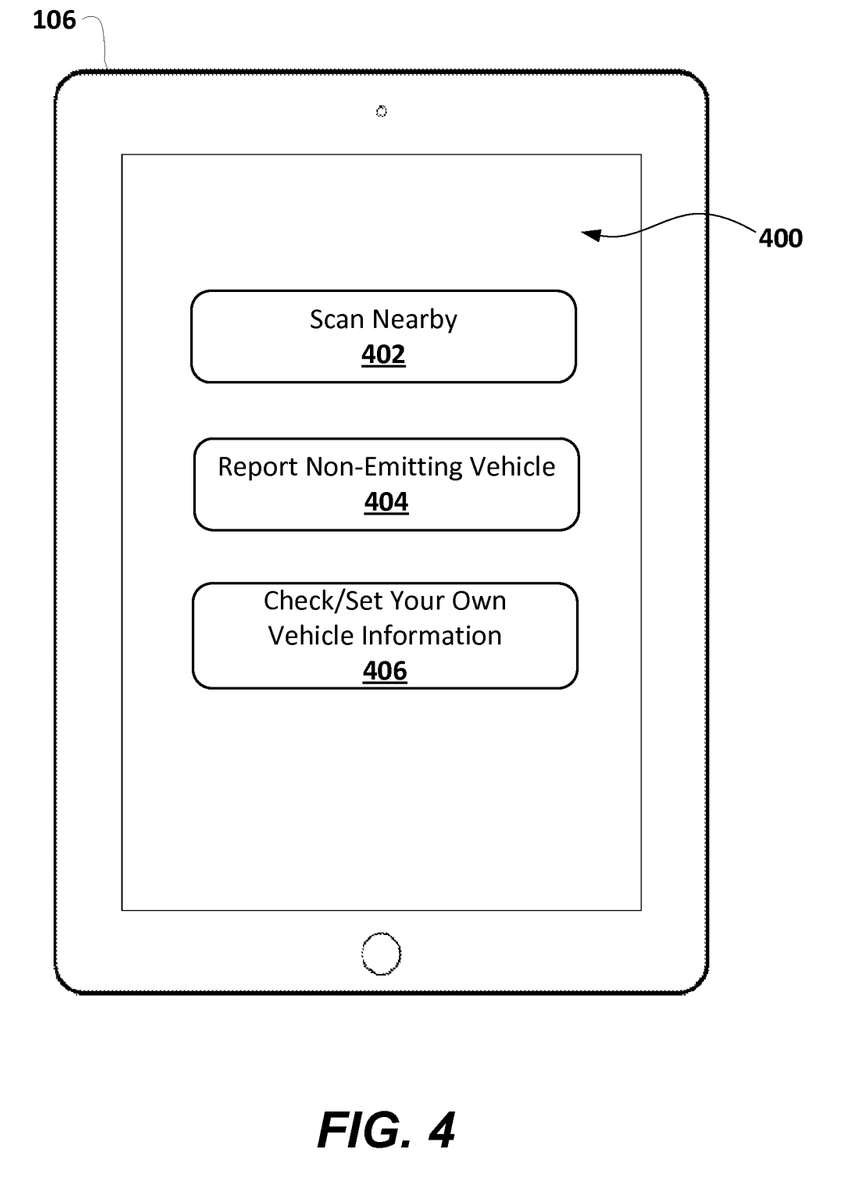
FIGS. 4-10 illustrate schematic diagrams of various graphical user interfaces (GUIs) displayable by an electronic device at different stages of vehicle status identification, according to embodiments of the present disclosure.

FIG. 4 shows a GUI 400 displayable at the time of activation of an application 218 for vehicle identification. In an example embodiment, the interface 400 includes actionable messages (buttons) or hyperlinks. Namely, these are 'Scan Nearby' button 402 and 'Report Non-Emitting Vehicle' button 404. When the user presses the button 402, the method 300 is activated and similarly, by pressing the button 404, at least some steps of a method for reporting non-emitting vehicles are implemented. 'Check/Set Your Own Vehicle Information' button 406 allows the user with login credentials to check and set information of vehicles the user owns.

Figure 5:
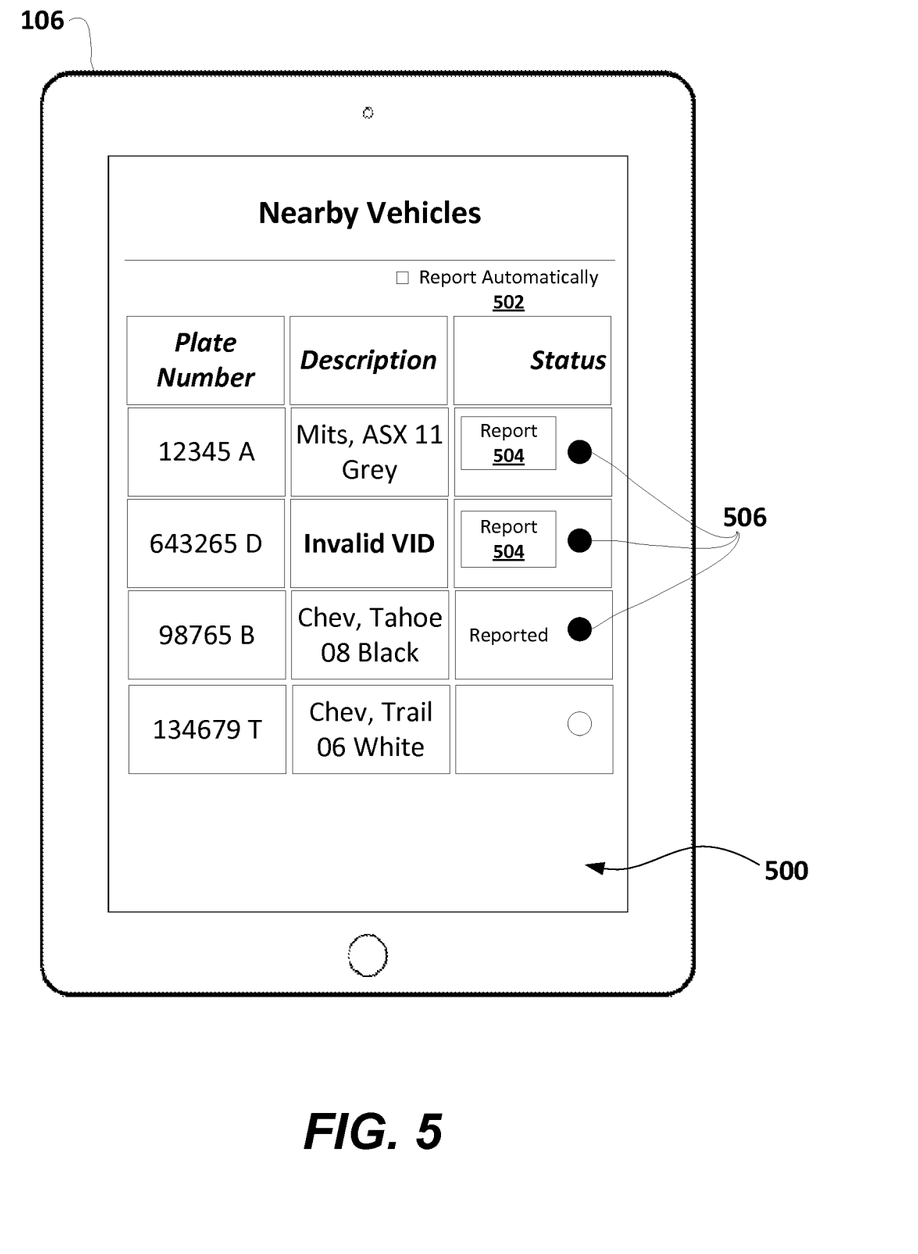

FIG. 5 shows a GUI 500 displayable in response to a press of the button 402. In particular, the GUI 500 shows the results of the method 300 for vehicle identification, which includes a tray (output box) where a table is presented. The table shows vehicle plate numbers of located vehicles, basic descriptions of vehicles, and vehicle statuses as acquired from the server. As shown in the figure, one of the table string lists 'Invalid VID' meaning that the vehicle with the plate number '643265 D' is emitting a VID that is not listed in the database of vehicle statuses and thus requires special attention by competent authorities. One of the table strings lists a vehicle with a black dot 506 and plate number '12345 A' meaning that the vehicle with plate number '12345 A' is listed in the database with a Wanted/Stolen status reflected on the interface by the black dot 506. A 'Report' button 504 can be used by the user in order to report the vehicle on the same row of the table of the GUI 700 shown on FIG. 7. As shown on FIG. 5, the vehicle with plate number '98765 B' with the black dot 506 has already been reported by the user of device 106. A 'Report Automatically' button 502 can be used by the user of device 106 to choose for the device 106 to report automatically about suspicious vehicles that are within the range area. Each string in the table may be actionable according to levels of clearance. For example, upon the user pressing on the line showing '987265 D' as a plate number, the GUI is replaced with a GUI 600 shown in FIG. 6.

Figure 6:
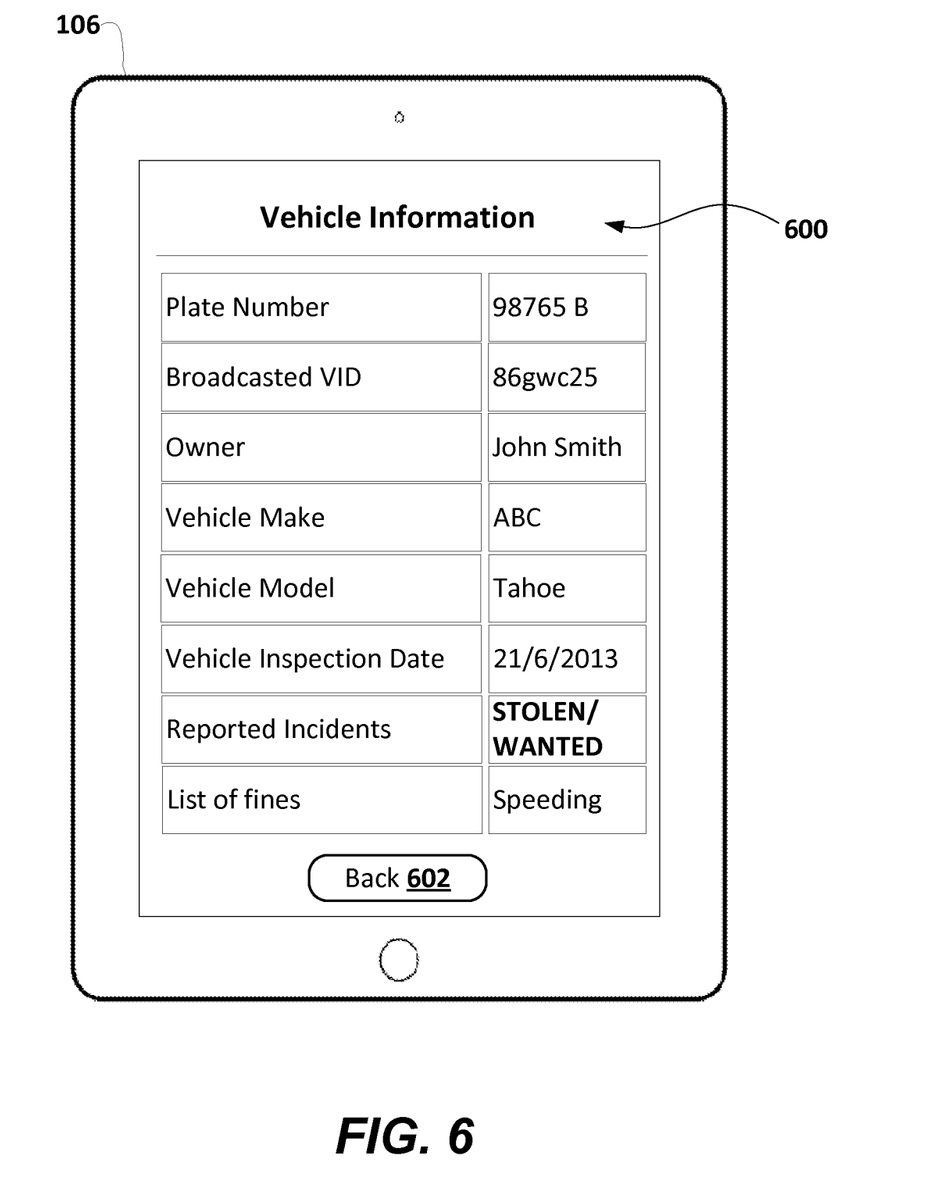

As illustrated in FIG. 6, the GUI 600 contains a table with detailed information regarding the selected vehicle 102. This may include, but is not limited to, vehicle registration data, plate number, owner's name, date of last state inspection, vehicle make, vehicle model, vehicle color, vehicle year, vehicle's representable image, list of reported incidents or accidents, list of offences associated with the vehicle or vehicle's owner, or a combination thereof. The GUI 600 also includes one actionable button: a 'Back' button 602 to return to the previous GUI 500.

Figure 7:
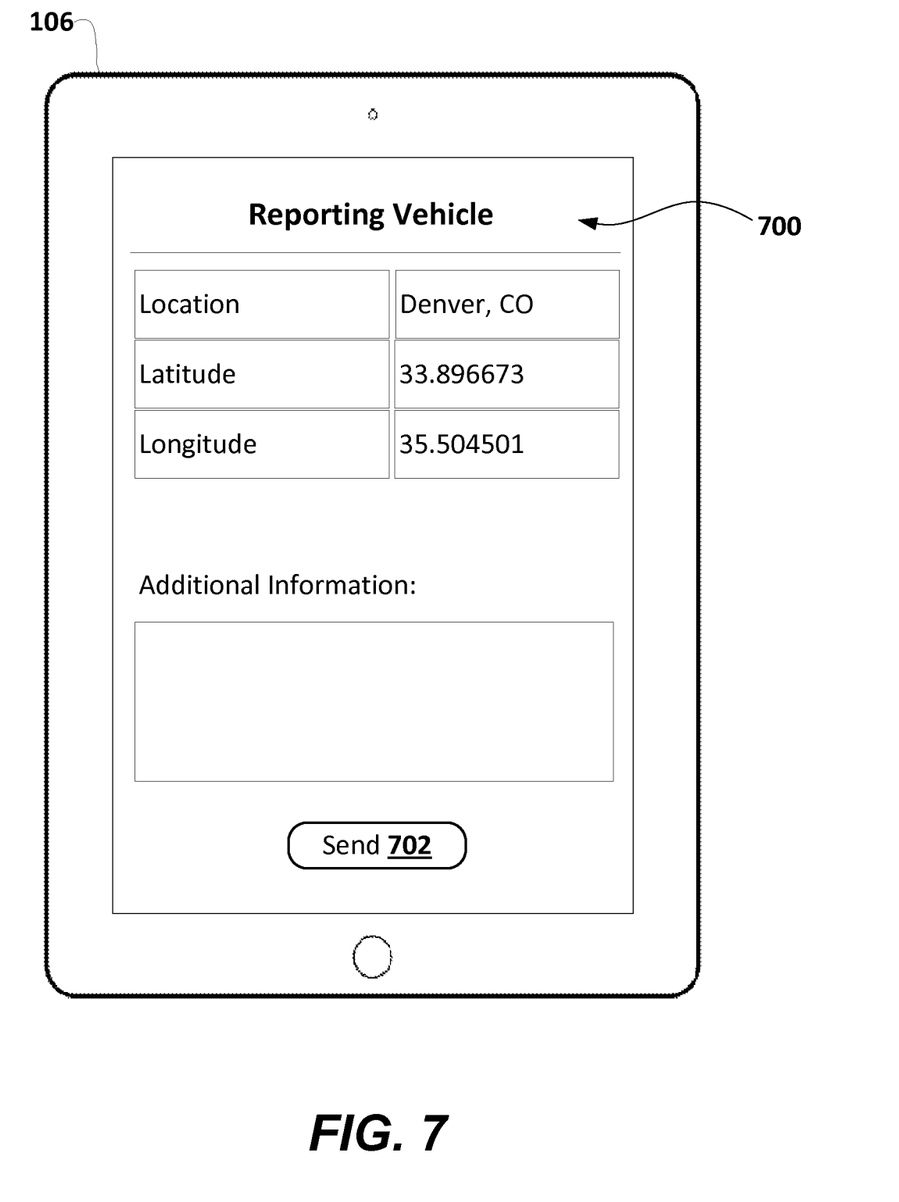

FIG. 7 shows a GUI 700 displayable in response to the press of the button 504 shown on FIG. 5. FIG. 7 illustrates the GUI 700 suitable for reporting to one or more authorities 116. The GUI 700 includes a tray showing multiple fields with information subject for inclusion into a report. This may include, but is not limited to, location information, plate number, vehicle identifier, vehicle registration data, and additional information. Upon the user pressing a 'Send' button 702, the electronic device 106 transmits the report to one or more of the authorities 116.

Figure 8:
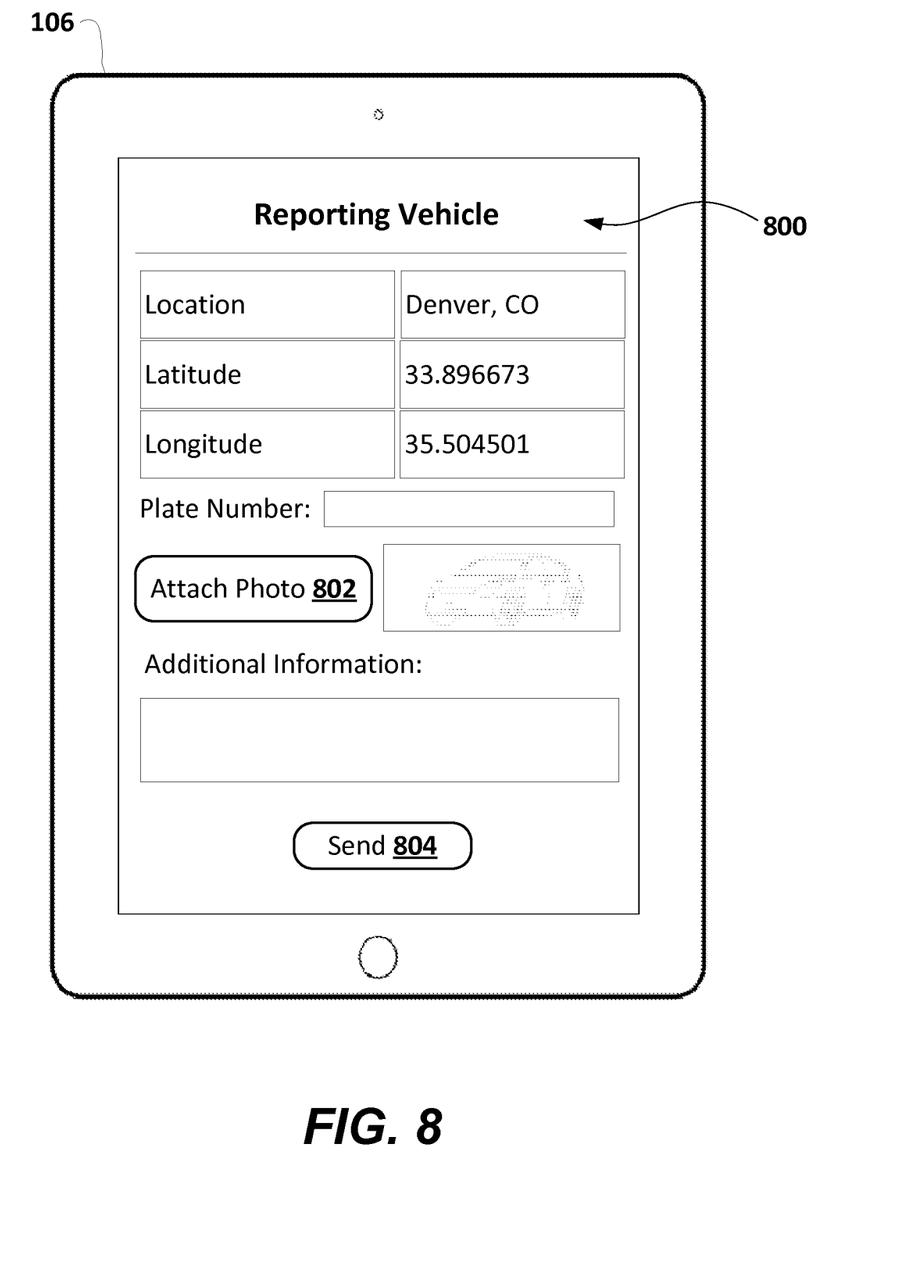

FIG. 8 shows a GUI 800 displayable in response to the press of the button 404. In particular, the GUI 800 relates to a method of reporting to the authorities 116 when a suspicious vehicle is identified by the user as not emitting any signal. Similar to FIG. 7, the GUI 800 shown in FIG. 8 has a tray for showing what information will be included or subject to inclusion into a report message. This includes, without limitation, location information, vehicle registration data (if available), plate number (which can be input by the user), a photo of the suspect vehicle (which can be added by the user when a "Attach Photo' button 802 is activated), and additional information (as can be input by the user). Upon the user pressing a 'Send' button 804, the electronic device 106 transmits the report to the one or more of the authorities 116.

Figure 9:
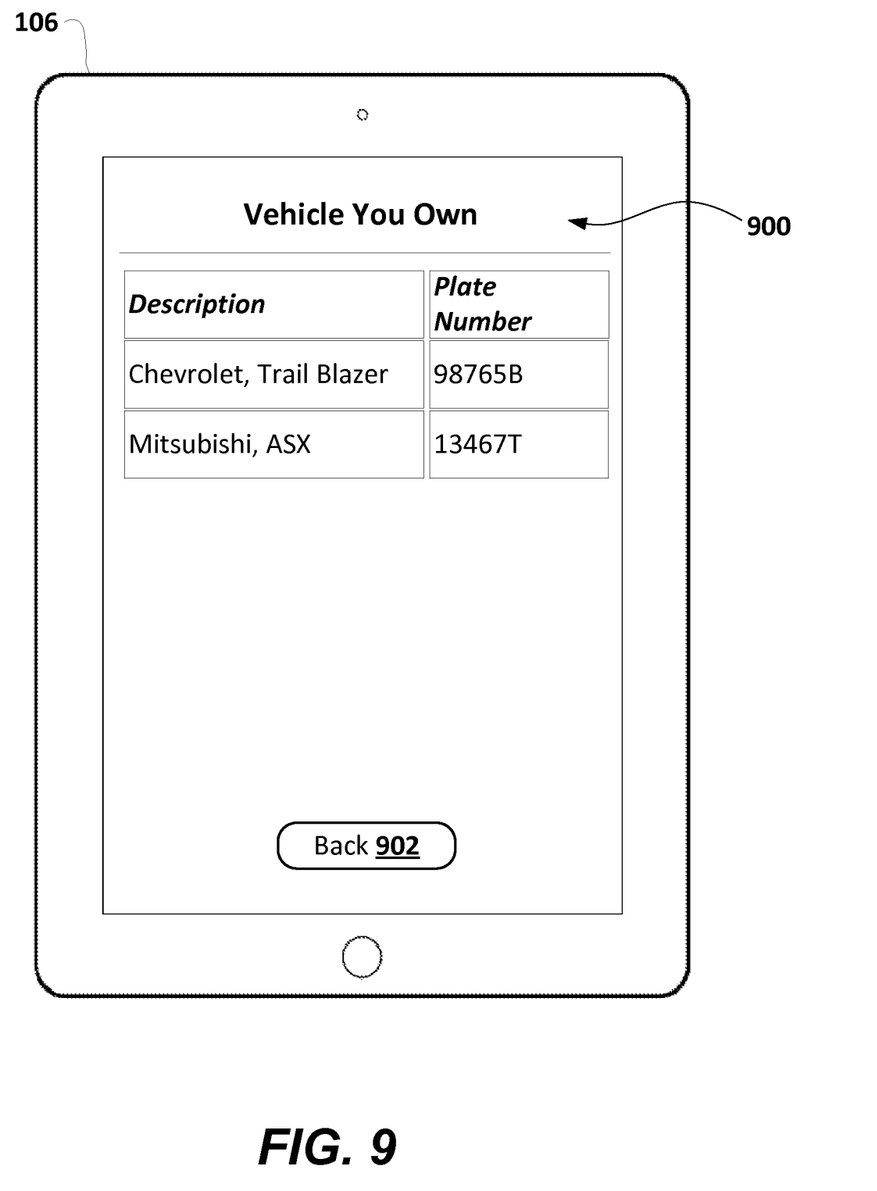

FIG. 9 shows a GUI 900 displayable in response to the press of the button 406 shown on FIG. 4. The GUI 900 displays a list of vehicles owned by the user currently logged into the system with specific secure credentials. The GUI 900 displays a table of strings with basic vehicle description and plate numbers. The GUI 900 also includes one actionable button: a 'Back' button 902 to return to the previous GUI 400. Each string in the table may be actionable. For example, upon the user pressing on the line showing '98765B' as a plate number, the GUI 900 is replaced with a GUI 1000 shown on FIG. 10.

Figure 10:
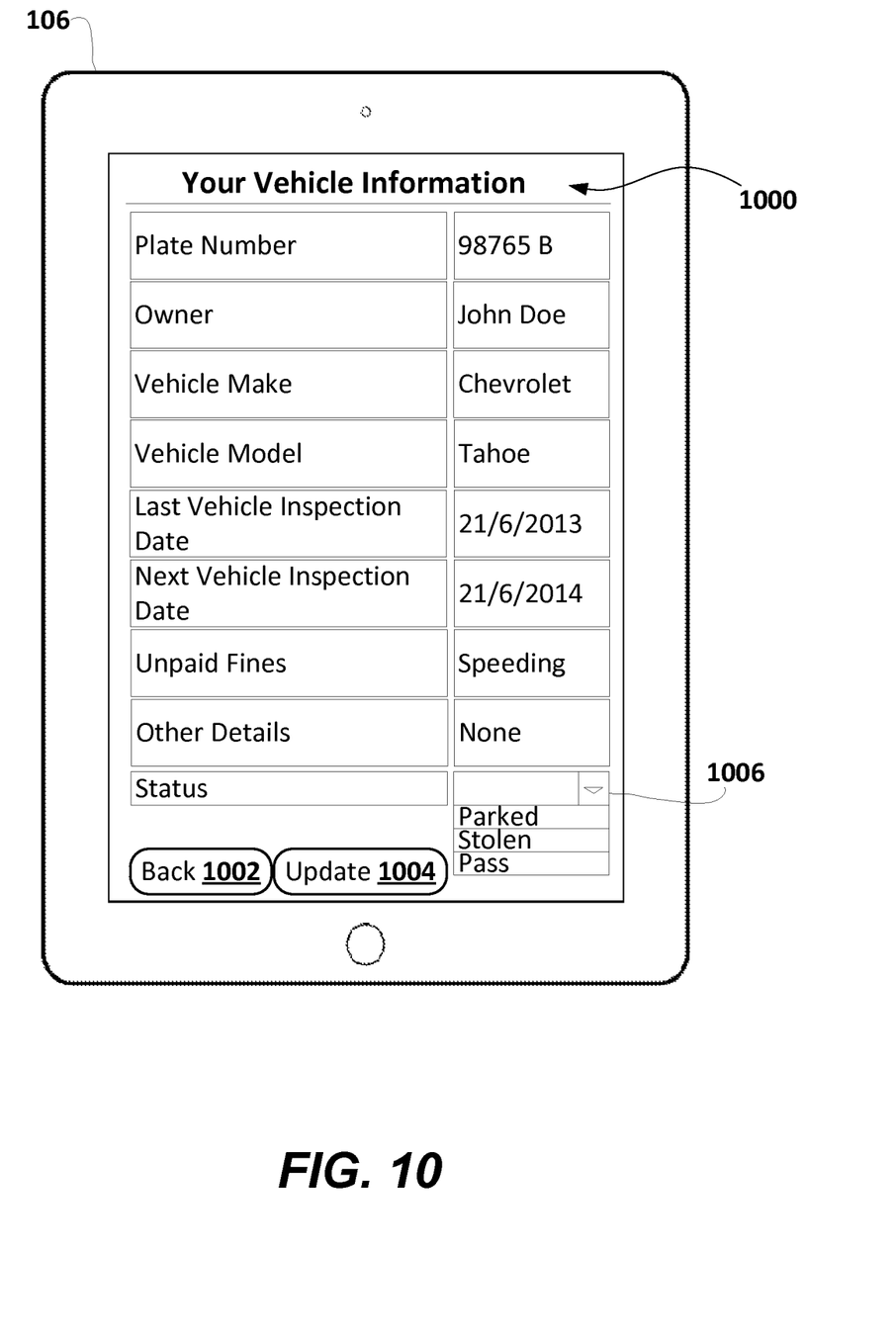

FIG. 10 shows a GUI 1000 displaying the user information about a particular vehicle the user owns. Information includes unpaid fines, last vehicle inspection date, next vehicle inspection date, and so forth. The GUI 1000 also includes an actionable button or drop down button 1006 for the user to set the status of the user own vehicle, such as parked, stolen, pass, and the like. The GUI 1000 also includes an actionable 'Update' button 1004 that the user needs to press in order to update, in the database, the new status of the user vehicle chosen by activation of button 1006. The GUI 1000 also includes an actionable 'Back' button 1002 to go to the previous GUI 900.

Thus, systems and methods for vehicle identification have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for vehicle identification, the method comprising:
   acquiring, by an electronic device having at least a processor and a memory storing processor-executable instructions, at least one identification signal emitted by an identification tag secured to a vehicle, wherein the at least one identification signal conveys a vehicle identifier associated with the vehicle;
   receiving, via the electronic device, an inquiry to display a vehicle status associated with the vehicle, the inquiry being provided by a user associated with the electronic device;
   determining, based on the inquiry, a clearance level associated with the user, wherein the determining of the clearance level includes:
      determining whether the inquiry includes the vehicle identifier and credentials provided by the user;
      based on the determining that the inquiry includes the vehicle identifier without the credentials associated with the user, assigning a first clearance level to the user; and
      based on the determining that the inquiry includes the vehicle identifier and the credentials associated with the user, assigning a second clearance level to the user;
   sending the inquiry, by the electronic device, to at least one server maintaining a database of vehicle statuses, wherein the inquiry comprises the vehicle identifier and one of the first clearance level and the second clearance level of the user associated with the electronic device;
   receiving, by the electronic device, a response from the at least one server, the response comprising the vehicle status;
   if a presence of the first clearance level in the inquiry is determined, displaying the vehicle status and a vehicle description on a display of the electronic device;
   if a presence of the second clearance level in the inquiry is determined, displaying the vehicle status, the vehicle description, and a clearance level-specific information on the display of the electronic device, wherein the clearance level-specific information includes information for displaying to at least one of the following: a police officer, a security provider, a military officer, a government officer, a parking officer, and an authority officer; and
   wherein the electronic device is located within a range area of the at least one identification signal.

2. The method of claim 1, further comprising:
   sending the inquiry, by the electronic device, to at least one server maintaining a database of registered vehicles;
   receiving, by the electronic device, an additional response from the at least one server, the response comprising a vehicle information, wherein the vehicle information comprises a vehicle's owner name, a plate number, a vehicle make, a vehicle model, a vehicle color, a vehicle year, a vehicle representable image, a list of reported incidents or accidents, and a list of offences associated with the vehicle or a vehicle owner, wherein the vehicle information is received according to the second clearance level; and
   displaying the vehicle information on a display of the electronic device.

3. The method of claim 1, wherein the vehicle status comprising information as to whether or not the vehicle is listed in the database of vehicle statuses.

4. The method of claim 1, further comprising:
   providing a graphical user interface displayable by the portable electronic device and displaying a list of descriptions of vehicles within a range area; and
   prompting, by the electronic device via the graphical user interface, a user to report the vehicle status associated with the vehicle to one or more state or government authorities or choose an automatic reporting.

5. The method of claim 4, further comprising transmitting, by the electronic device, a report to the one or more state or government authorities via at least one communications network, wherein the report comprises the vehicle identifier.

6. The method of claim 5, wherein the report further comprises vehicle registration information associated with the vehicle.

7. The method of claim 4, further comprising transmitting, by the electronic device, a report to the one or more state or government authorities via at least one communications network, wherein the report comprises location information associated with the vehicle.

8. The method of claim 4, further comprising transmitting, by the electronic device, a report to the one or more state or government authorities via at least one communications network, wherein the report comprises an image of the vehicle.

9. The method of claim 1, wherein the identification signal further comprises a plate number associated with the vehicle.

10. The method of claim 1, wherein the vehicle status includes one of the following: stolen, wanted, parked, on travel, unlisted (invalid ID), and pass (clear).

11. The method of claim 1, wherein the response further comprises information associated with vehicle registration and a vehicle state inspection date.

12. The method of claim 1, wherein the response further comprises a list of outstanding fines associated with the vehicle.

13. The method of claim 1, wherein the response further comprises a list of permits associated with the vehicle.

14. The method of claim 1, wherein the identification tag includes a Wi-Fi emitter tag.

15. The method of claim 1, wherein the electronic device comprises one or more of the following: a portable electronic device, a personal digital assistant, a cellular phone, a portable computer, and a tablet computer.

16. The method of claim 1, further comprising prompting, by the electronic device via a graphical user interface, a user to make a report to one or more state or government authorities, wherein the report is associated with a vehicle not emitting an identification signal.

17. The method of claim 16, further comprising transmitting, by the electronic device, the report to the one or more state or government authorities via a communications network, wherein the report includes an electronic message conveying location information associated with the vehicle not emitting an identification signal.

18. The method of claim 17, wherein the electronic message further conveying a photo of the vehicle not emitting an identification signal.

19. The method of claim 1, wherein the database of vehicle statuses includes a crowdsourcing online service.

20. The method of claim 1, further comprising:
providing a graphical user interface displayable by the portable electronic device and displaying a list of description of vehicles, wherein the vehicles include one or more vehicles a user owns; and
prompting, by the electronic device via the graphical user interface, the user to check vehicle information of the one or more vehicles the user owns.

21. The method of claim 20, further comprising:
prompting, by the electronic device via the graphical user interface, the user to set the vehicle status associated with the one or more vehicles the user owns.

22. A non-transitory processor-readable medium having instructions stored thereon, which when executed by one or more processors, cause the one or more processors to implement a method for vehicle identification, the method comprising:
acquiring at least one identification signal emitted by an identification tag secured to a vehicle, wherein the at least one identification signal conveys a vehicle identifier associated with the vehicle;
receiving an inquiry to display a vehicle status associated with the vehicle, the inquiry being provided by a user associated with the electronic device;
determining, based on the inquiry, a clearance level associated with the user, wherein the determining of the clearance level includes:
determining whether the inquiry includes the vehicle identifier and credentials provided by the user;
based on the determining that the inquiry includes the vehicle identifier without the credentials associated with the user, assigning a first clearance level to the user; and
based on the determining that the inquiry includes the vehicle identifier and the credentials associated with the user, assigning a second clearance level to the user;
sending the inquiry to at least one server maintaining a database of vehicle statuses, wherein the inquiry comprises the vehicle identifier and the one of the first clearance level and the second clearance level of the user associated with the electronic device;
receiving a response from the at least one server, the response comprising the vehicle status;
if presence of the first clearance level in the inquiry is determined, displaying the vehicle status and a vehicle description on a display of the electronic device, the electronic device being located within a range area of the at least one identification signal; and
if presence of the second clearance level in the inquiry is determined, displaying the vehicle status, the vehicle description, and a clearance level-specific information on the display of the electronic device, wherein the clearance level-specific information includes information for displaying to at least one of the following: a police officer, a security provider, a military officer, a government officer, a parking officer, and an authority officer.

* * * * *